United States Patent [19]
Spinks

[11] 3,811,664
[45] May 21, 1974

[54] VEHICLE SUSPENSION UNITS
[75] Inventor: Ralph William Spinks, Birmingham, England
[73] Assignee: Girling Limited, Birmingham, England
[22] Filed: Oct. 29, 1971
[21] Appl. No.: 193,628

[30] Foreign Application Priority Data
Nov. 17, 1970 Great Britain................... 54610/70

[52] U.S. Cl................................... 267/66, 267/65
[51] Int. Cl............................................ B60g 13/06
[58] Field of Search................. 267/64 A, 65 R, 66

[56] References Cited
UNITED STATES PATENTS
| 1,669,828 | 5/1928 | Harley | 267/65 R |
| 3,353,814 | 11/1967 | Rees et al. | 267/64 R |
| 1,426,058 | 8/1922 | Pritz | 267/65 R |
| 3,177,965 | 4/1965 | Dews | 267/66 |

Primary Examiner—James B. Marbert
Attorney, Agent, or Firm—Scrivener Parker Scrivener & Clarke

[57] ABSTRACT

A vehicle suspension unit comprises a housing tube with an increased diameter lower end portion which can be releasably secured in a corresponding recess in a stub axle. The increased diameter portion provides a shoulder which, in use is abutted by an annular retaining member which surrounds, the housing tube to retain the increased diameter portion within the socket.

7 Claims, 1 Drawing Figure

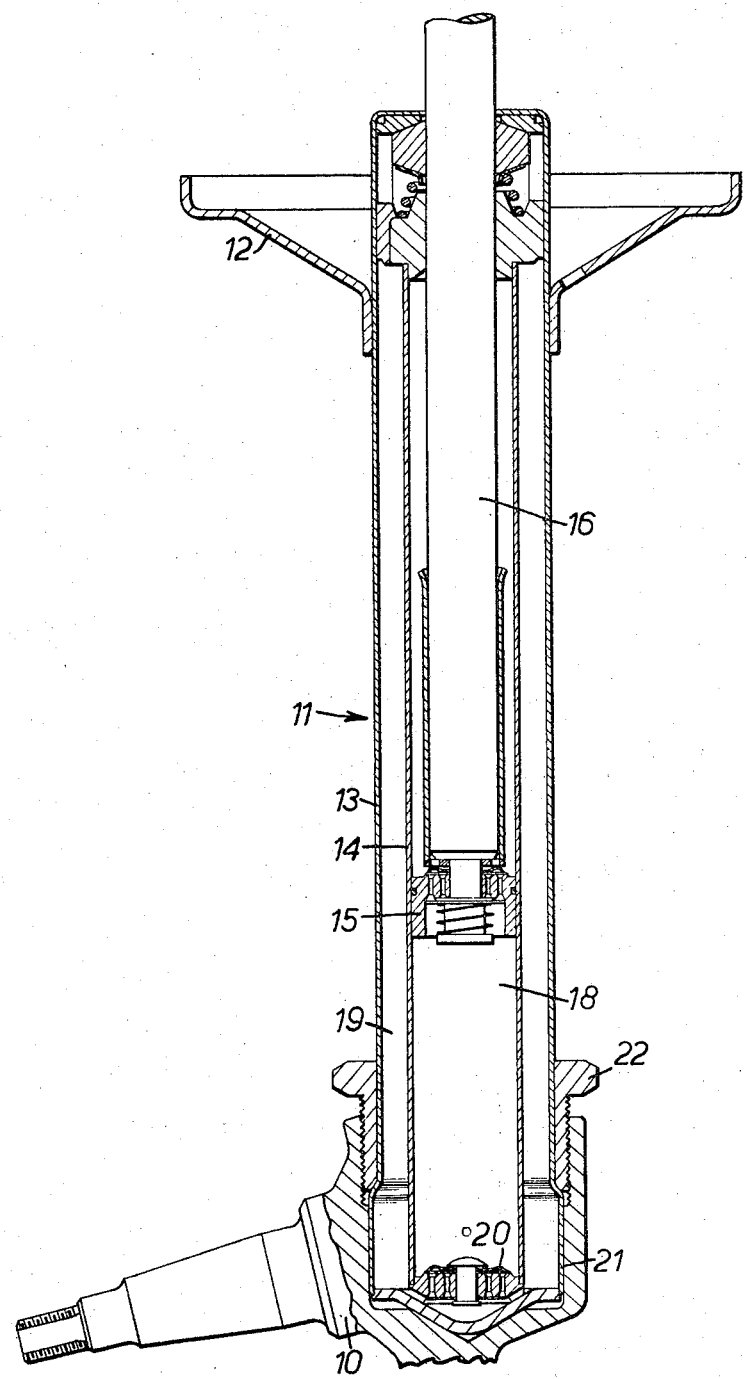

VEHICLE SUSPENSION UNITS

The invention relates to vehicle suspension units and particularly, but not exclusively, to units having the same general form and construction as the well known McPherson strut, that is to say hydraulically damped suspensions units which carry or are adapted to carry at their lower ends stub axles which carry steerable road wheels of a vehicle. The part of the units which in use carry the stub axle are rotatable about the longitudinal axes of the units to accommodate steering movement of the road wheels.

Conventional units having this form normally have twin tubes the outer of which is welded or otherwise permanently secured to the stub axle. When a replacement cartridge unit is fitted the inner tube together with an associated base valve and piston rod assembly are removed from within the outer tube and are replaced by the self contained cartridge unit; thus the volume between the tubes available forming a reservoir chamber is substantially reduced. In some cases it can be reduced to such an extent that on a full stroke of the piston the fluid in the damper is pressurised to a degree which adversely effects the performance of the damper.

According to the present invention a vehicle suspension unit for attachment to a stub comprises a housing tube having an increased diameter lower end portion which is, in use, releasably secured in a socket in the stub axle by an annular retaining member surrounding the housing tube and abutting the shoulder provided by the end portion.

Thus a suspension unit according to the invention can be replaced by a similar unit without replacing the stub axle, and the use of the self-contained replacement cartridge unit is avoided.

Preferably the unit is a twin tube unit having an outer and an inner tube, the outer tube constituting the housing tube. Such a unit has a chamber between the inner and outer tubes and the increased diameter portion provides an increased chamber volume, reducing the possibility of fluid in the unit being excessively compressed during a long damper stroke.

One form of vehicle suspension unit according to the invention including a stub axle will now be described by way of example, with reference to the accompanying drawing, which is a vertical cross section through the unit.

The suspension unit shown in the drawing which is of the same general form as a McPherson strut unit, comprises a stub axle 10 and a hydraulic damper strut 11 having a flange 12 fixed to it at its upper end, the flange 12 forming a lower abutment for the vehicle suspension spring (not shown). The damper strut 11 is of a twin tube construction having an outer tube 13 and an inner tube 14. A piston 15 slides in the inner tube 14 and is connected to a piston rod 16 which, in use, is attached at its upper end to the vehicle body. The two tubes 13 and 14 are closed at their top ends. A valve 20 comprising two oppositely directed one-way valves controls flow of fluid from the reservoir chamber 19 and the piston chamber 18. The piston 15 is formed with two oppositely directed one way valves.

The outer tube 13 is formed with a bottom portion 21 having an increased diameter. This portion fits into a corresponding cylindrical socket in the stub axle 10 and an annular locking nut 22 surrounding the outer tube 13 locks the damper strut firmly in the socket so that it abuts against the bottom of the socket. Thus the damper strut 11 can be replaced by a similar damper strut without replacing the stub axle 10 or the suspension spring (not shown).

The length of the increased diameter portion 21 is such that no rocking motion of the damper strut 11 takes place within the stub axle 10. The increased diameter portion 21 also acts to lock the damper strut 11 to the stub axle 10 preventing rotation of the damper strut within the stub axle. However further means may be provided which positively lock the damper strut to the stub axle and hence prevent relative movement between them.

If a single tube damper strut is used, and connected to the stub axle in the manner described above, it is preferable to provide the increased diameter portion by means of a collar or cup securely attached to the bottom of the tube. This construction could also be applied to a standard twin tube unit.

I claim:

1. A vehicle suspension unit for attachment to a stub axle having a socket for receiving said unit, said unit comprising a housing tube having an increased diameter lower end portion, a shoulder provided by said lower end portion, and an annular retaining means surrounding said housing tube and which, in use, releasably secures said lower end portion in said socket and abuts said shoulder.

2. A vehicle suspension unit is defined in claim 1, wherein a collar or cap or the like is attached to said housing tube to form said increased diameter lower end portion.

3. A vehicle suspension unit as defined in claim 1 and including an inner tube within said housing tube, and a reservoir chamber therebetween.

4. A vehicle suspension unit comprising a housing tube having an increased diameter lower end portion, a shoulder provided by said lower end portion, a stub axle, a socket in said stub axle to receive said lower end portion, and an annular retaining means surrounding said housing tube and releasably securing said lower end portion in said socket, said retaining means being connected to said stub axle and abutting said shoulder.

5. A vehicle suspension unit as defined in claim 4, wherein a collar or cup or the like is attached to said housing tube to form said increased diameter lower end portion.

6. A vehicle suspension unit as defined in claim 4 and including an inner tube within said housing tube and a chamber therebetween.

7. A vehicle suspension unit as defined in claim 4, wherein said retaining means is in the form of an annular nut in screw threaded engagement in said socket.

* * * * *